United States Patent [19]

Vaucher

[11] Patent Number: 5,253,225
[45] Date of Patent: Oct. 12, 1993

[54] COMPASS WATCH OF THE MECHANICALLY OR ELECTROMECHANICALLY DRIVEN TYPE AND BEZEL SPECIFICALLY INTENDED FOR SUCH A WATCH

[75] Inventor: Frank Vaucher, Cormoret, Switzerland

[73] Assignee: Compagnie des Montres Longines, Francillon S.A., St-Imier, Switzerland

[21] Appl. No.: 686,925

[22] Filed: Apr. 18, 1991

[30] Foreign Application Priority Data

Apr. 18, 1990 [CH] Switzerland .................. 01308/90

[51] Int. Cl.⁵ .................................. G04B 19/26
[52] U.S. Cl. .................................. 368/20; 368/15; 368/17; 33/269; 33/271
[58] Field of Search .............. 33/269, 270, 271, 150; 368/15–20, 10

[56] References Cited

U.S. PATENT DOCUMENTS

| | | | |
|---|---|---|---|
| 460,097 | 9/1891 | Burgdorff | 33/270 |
| 1,217,937 | 6/1917 | Greene | 33/271 |
| 1,258,160 | 3/1918 | Slater | 33/271 |
| 2,032,462 | 3/1936 | Bean | 33/271 |
| 4,899,451 | 2/1990 | Dandurand | 33/269 |

FOREIGN PATENT DOCUMENTS

| | | | |
|---|---|---|---|
| 2203106 | 10/1972 | France | |
| 11340 | 10/1895 | Switzerland | |
| 17319 | of 1895 | United Kingdom | 33/271 |
| 2920 | of 1896 | United Kingdom | 33/271 |
| 351469 | 1/1990 | United Kingdom | |

*Primary Examiner*—Bernard Roskoski
*Attorney, Agent, or Firm*—Griffin Butler Whisenhunt & Kurtossy

[57] ABSTRACT

This invention concerns a compass watch as well as a bezel specifically intended to fit out such a watch. The invention comprises at least one time indicating element (4) kinematically driven in rotation by a mechanical or electromechanical horometric movement, and particularly intended to be pointed towards the sun, and direction indicating means (N, S, W, E) arranged on said watch enabling one to know, as a function of the orientation of said indicating means (4), the direction of at least one of the cardinal points, and is characterized in that it includes correction means (52; 16, M) for the positioning of the cardinal points, adapted to take into account the equation of time and to correct any variation between true solar time and the legal or local time of day. The invention is applied to a watch, preferably of the mechanically or electromechanically driven type.

21 Claims, 5 Drawing Sheets

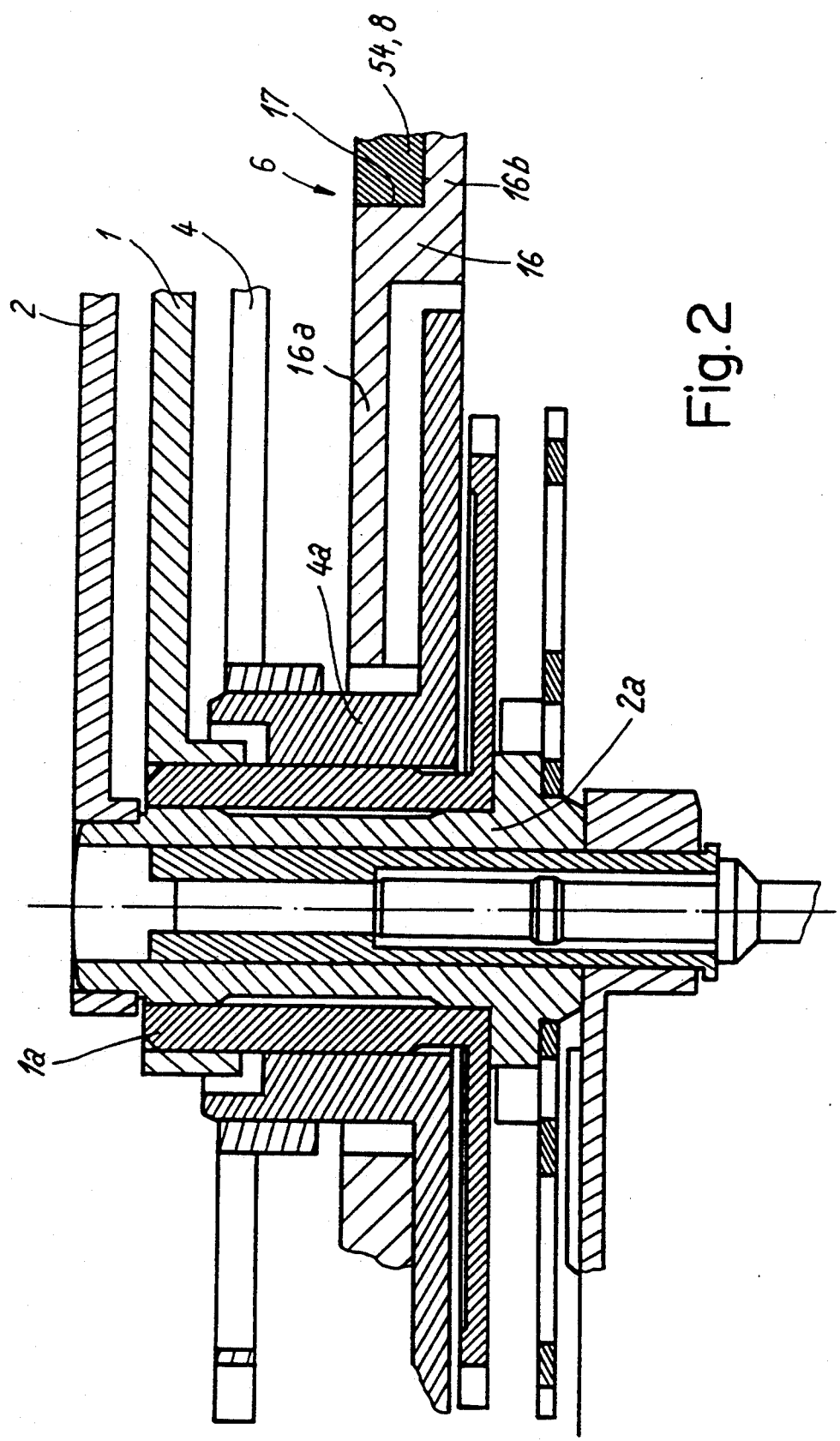

COMPASS WATCH OF THE MECHANICALLY OR ELECTROMECHANICALLY DRIVEN TYPE AND BEZEL SPECIFICALLY INTENDED FOR SUCH A WATCH

This invention concerns a compass watch and more particularly a compass watch of the mechanically or electromechanically driven type.

Similarly, it concerns a bezel intended to fit out such a watch.

BACKGROUND OF THE INVENTION

A mechanically or electromechanically driven compass watch is already known, as described for example in the patent application FR 2 203 106, including time indicating elements such as hours and minutes hands respectively which are associated with direction indicating means constituted by a compass card.

Such compass card which enables one thus to be oriented through indicating the position of the different cardinal points, is kinematically coupled to a horometric movement which, in a standard manner, controls the displacement of the hours and minutes hands and which, at each instant, orients the compass card in a manner such that the south inscribed on the latter points in the direction corresponding to the bisector of the acute angle which is formed between the hours hand and midday marked on the watch. As is well understood, in order to determine validly the south direction and, consequently, that of the other cardinal points, it is indispensable, during the reading, to point the hours hand simultaneously towards the sun.

Further, there is known in particular according to patent application DE 3 631 513, a compass watch which is provided, in addition to the two standard hours and minutes hands, with a third hand referred to as the solar hand, which effects one revolution around the dial every 24 hours under the action of the horometric movement which controls it and which forms the indicating means to be pointed towards the sun.

Thus, in order to determine one's orientation, it suffices to point such solar hand towards the sun, then to read from the watch the direction indications, namely to take note of the information given by the different cardinal points which are permanently marked on the watch, and in particular on the dial thereof.

These two watch types thus enable one to be oriented very rapidly in avoiding utilization of a magnetized hand which, as is known, is particularly sensitive to any exterior influence. Moreover such magnetized hand may be disturbed in a non-negligible manner by stray fields which may be created by the watch itself.

Nevertheless, these two types of compass watch driven mechanically or electromechanically, may furnish substantial orientation errors, essentially by reason of the gap between the legal or local time of day indicated by the watch and true solar time which in fact is that which alone should be taken into account since the orientation is given to the user as a function of his position relative to the sun.

This gap between the legal or local time of day and the true solar time may be substantial and bring about errors on the order of several degrees.

Effectively, on the one hand, it is known that true solar time coincides with the legal or local time of day only for persons located exactly on one of the meridians (that of Greenwich for Western Europe) All geographic separation relative to this meridian brings about a subsequent gap between the two times of day respectively legal and true solar, and gives a totally imprecise reading.

On the other hand, whether in winter or eventually summer, our ega time absolutely does not coincide with true solar time, the gaps varying from one to two hours.

It is evident that a correction method could consist in readjusting permanently, that is to say, at each measurement, the time displayed on the watch; in other words, to replace the legal time of day by true solar time and inversely.

However, such a manipulation may bring about errors if the user, after several readings and several resettings of the legal time of day, no longer remembers exactly on which time legal or solar, he has stopped.

In addition, such manipulations necessitate the decoupling of the drive of the horometric movement relative to the hands, which brings about, inevitably, loss of the correct time.

Thus, the invention has as its purpose to answer to these difficulties through proposal of a compass watch capable of being freed from the seasonal variations of time, geographical displacements relative to the meridians enabling reference to the legal time of day and spreads caused by the equation of time and this in order to assure to the user an excellent precision at the time of his orientation.

The invention also has as its purpose to provide a compass watch responding to the problem mentioned hereinabove and the structure of which enables one easily to call on a standard horometric movement without costly adaptation thereof.

SUMMARY OF THE INVENTION

To this end, the invention has as its object a compass watch of the mechanically or electromechanically driven type comprising:

at least one time indicating element kinematically driven in rotation by a mechanical or electromechanical horometric movement, and particularly intended to be pointed towards the sun, and direction indicating means arranged on said watch enabling one to know the direction of at least one of the cardinal points as a function of the orientation of said indicating means, including means for correcting the positioning of the cardinal points adapted. to take into account the equation of time and to correct any variation between true solar time and the legal or local time of day.

It is thus understood that in judiciously providing correction means at the level of the cardinal points, one may perfectly respond to the problem of spreading between the different times of day, respectively legal or true solar, without the necessity of conceiving nor of manufacturing complex mechanisms, in particular if one of the purposes sought after is the adaptation to a standard timepiece movement.

The invention will be better understood following reading of the detailed description which follows taking into consideration the attached drawings which are given solely by way of example.

BRIEF DESCRIPTION OF THE DRAWINGS

FIG. 2 is a partial cross-section through the hands of the compass watch according to the invention taken along the axis 12 o'clock - 6 o'clock when all hands are directly superposed;

DESCRIPTION OF THE PREFERRED EMBODIMENT

Figure 1:
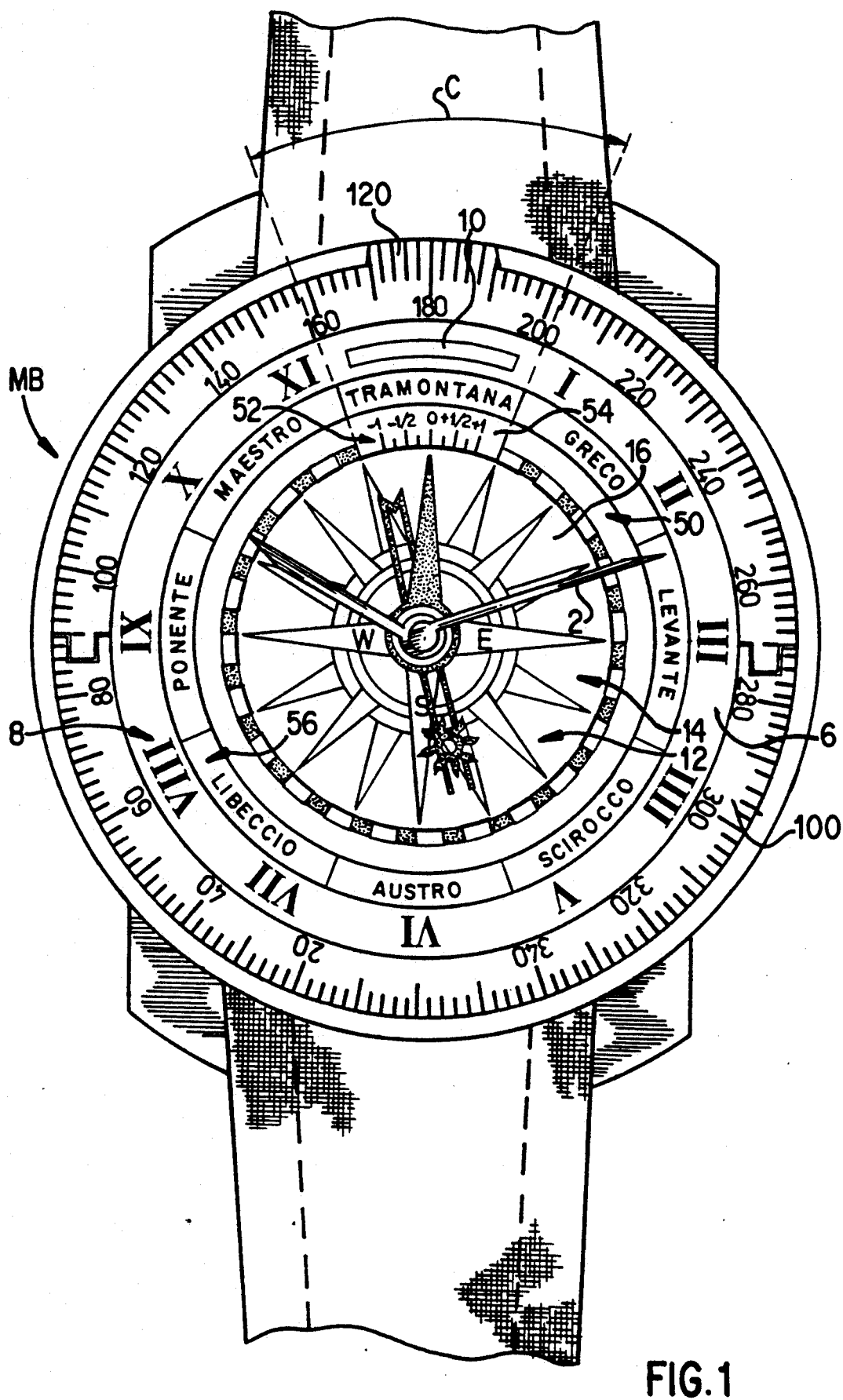
FIG. 1 is a top view of a compass watch according to the invention.

Referring henceforth to FIGS. 1 and 2, there will be described hereinafter and in its entirety, a compass watch according to the invention.

Such compass watch includes, in a standard manner, first and second time indicating elements constituted respectively by an hours hand 1 and a minutes hand 2.

It further includes a third indicating element 4 which will be described hereinafter as the solar hand and which is intended, as will be understood, to be oriented towards the sun.

Such three time indicating elements 1, 2 and 4 are kinematically driven in rotation by a timepiece or horometric movement (not shown) of the type either entirely mechanical or electromechanical.

The arrangement of such three indicating elements 1, 2 and 4 and that of the horometric movement which drives them has been shown on FIG. 2 only in a partial manner, since the arrangements are standard and within the grasp of the man skilled in the art.

There will be specified simply that the three hands 1, 2 and 4 are borne respectively by an hours pipe 1a, a minutes pipe 2a and by a last pipe 4a, referred to as the solar pipe Such three pipes 1a, 2a and 4a are guided coaxially and pivot relative to one another and they are driven in a standard manner by gear trains (not shown).

The hours hand 1 is driven at the rate of one revolution every twelve hours while the solar hand 4 effects a complete revolution every twenty-four hours.

Hands 1 and 4 will be directly superposed at midnight while at midday will be aligned along the same direction but in opposite senses.

Such three hands 1, 2 and 4 move above a dial 6 which is divided into several regions, respectively furnishing various information.

The outermost region 8 which is fixed includes hours indications marked from I to XI, the twelfth inscription referenced 10 advantageously corresponding to the brand name under which the watch in accordance with the invention is sold.

This region could evidently include another type of time indication according to different sequences.

Thus, it will be specified that, although this embodiment is described with three indicating elements 1, 2 and 4, such compass watch according to an embodiment not shown, could include solely the indicating element 4 which is indispensable thereto in order to provide the compass function as such.

Effectively, it is sufficient for this to mark region 8 with the FIGS. 1 to 24 or 23 (or I to XXIV or XXIII), the solar hand 4 giving, in this embodiment a time indication over twenty-four hours.

Dial 6 is provided, coaxially to this first region 8, with a second region 12 which is movable and which includes direction indicating means formed in this example by a compass card 14 on which several cardinal points are inscribed, respectively N for North, S for South, W for West and E for East.

Such direction indicating means 12 and N-S-W-E are materialized on an orientation disc 16 (partially shown on FIGS. 3a to 3c) which may pivot coaxially to the three hands 1, 2 and 4, either, preferably, as shown on FIG. 2, in a manner coplanar to the rest of the dial, or above or below the latter.

Figure 3A:
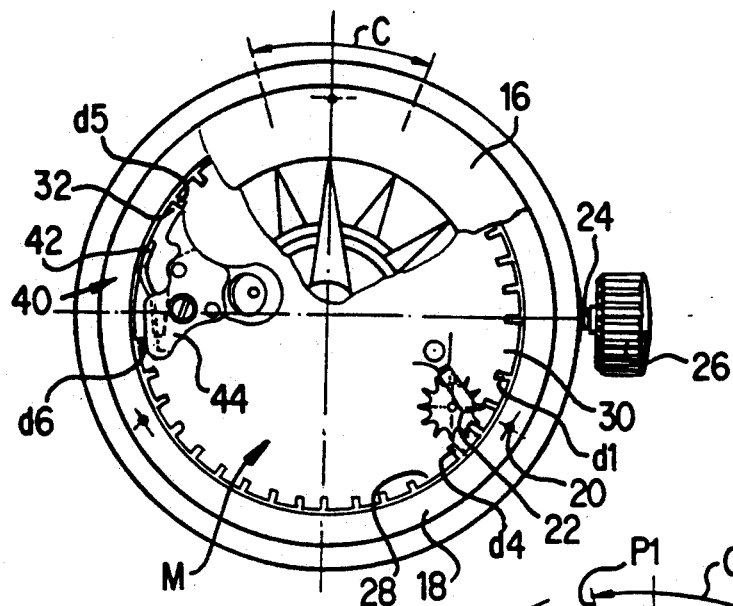
FIGS. 3a, 3b and 3c are top views taken in different positions of a driving and motion limiting mechanism for an orientation disc partially shown, forming part of the dial of FIGS. 1 and 2.
Figure 3B:
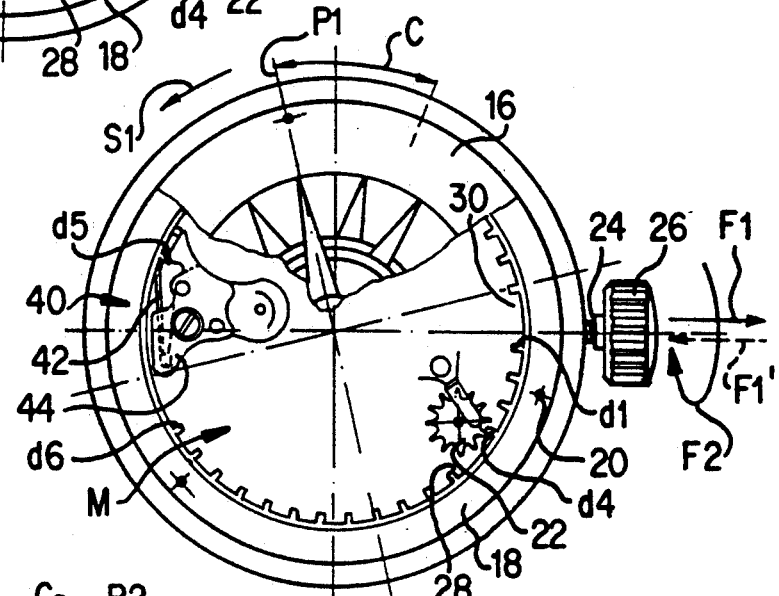
Figure 3C:
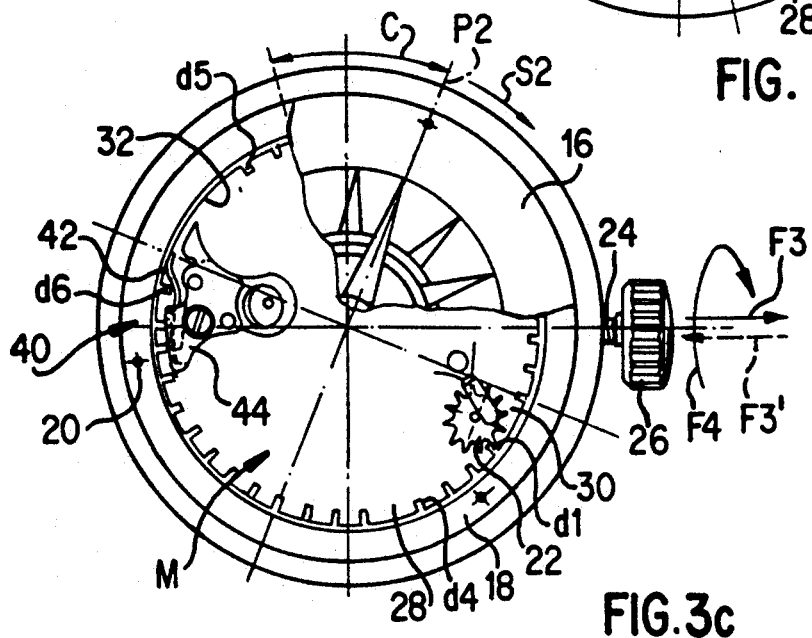

As is seen on FIG. 2, the movable disc 16, which is pierced at its center in order to permit passage of the solar pipe 4a, includes a shoulder 17 which is brought to fit in a corresponding opening provided in the fixed portion of the remainder of the dial The central portion 16a of disc 16 is thus raised relative to base 16b of this same disc which, as will be understood, is attached to a ring 18 visible on FIGS. 3a to 3c. The upper visible surface of the central portion 16a on which is marked the compass card 14 (FIG. 1) is thus situated at the same level as the upper surface of the remainder of the dial.

In referring henceforth to FIGS. 3ka to 3c, it is seen that the orientation disc 16 is fixedly mounted at its periphery on ring 18 which is of the date ring type, through three studs 20. Such ring 18 which is provided with teeth over at least a portion of its interior, constitutes one of the elements of a mechanism M which is adapted to drive, but also to limit the angular motion of the orientation disc 16.

Such driving and motion limiting mechanism M includes in addition a driving pinion 22 the lower guide axis of which is mounted on a base plate (not shown).

The motion of such driving pinion 22 is controlled solely by a control element accessible from the exterior, such as a stem 24 coupled to a winding crown 26 which, in order to activate the drive pinion 22, must be drawn out into a position shown on FIGS. 3b and 3c.

Ring 18 includes at least two regions 28 and 30, referred to as bared regions, which are without meshing teeth. Thus, when the control element 24, 26 is drawn and rotated by the user, in particular according to arrows F1, F2 and F3, F4, the driving pinion 22, in meshing with teeth d1 to d4 of ring 18, causes pivoting of such ring 18 according to a desired sense S1 or S2, this bringing about the angular displacement of the orientation disc 16 in a corresponding sense.

Nevertheless, when drive pinion 22 attains regions 28 or 30, it does not encounter a meshing tooth so that it is found uncoupled from the ring 18 at least in the pivoting sense in which it was driven by the exterior control element 24, 26.

Thus, whether this be for rotation sense S1 or for rotation sense S2, the driving mechanism M limits the angular displacement of ring 18 and thus that of the orientation disc 16 as far as the two positions P1 and P2, referred to as bounding positions.

Such two bounding positions P1 and P2 thus define an angular travel of the orientation disc 16, referred to as the correction course C.

Mechanism M is furthermore associated with braking means 40 constituted by a third bared region 32 provided on ring 18, and onto which is placed in frictional contact an elastic element 42 formed for instance by a spring blade of the jumper spring type The elastic element 42 is secured onto a base 44 which is for instance fixed to the base plate of the horometric movement (not shown), such base 44 partially overlapping certain of the teeth of ring 18 so that it maintains such ring 18 in place, at least in an axial direction.

The elastic element 42 is shaped so as to be brought to bear laterally on the smooth face of the third bared region 32 whereby it applies to the latter a light pressure which brakes the displacement of ring 18 and that of the orientation disc 16 over the entire correction course C.

Additionally, it will be noted that the elastic element 42 is shaped in a manner such that its free end forms abutment means for ring 18, in particular when such ring occupies its bounding positions P1 and P2.

As is seen on FIG. 3b, when the orientation disc 16 and more particularly mark N inscribed on the latter attains its first bounding position P1, the free end of the elastic element is brought to abut against one (d5) of end edges d5 and d6 which bound the third bared region 32. The end edge d5 is constituted in this embodiment by one of the teeth of the ring 18 which here no longer have any meshing function.

Inversely, when the orientation disc 16 and in particular the mark N inscribed on the latter attains its second end position P2, the back of the bent portion of the free end of the elastic element 42 comes to abut against the other extreme edge d6 of the third bared region 32 which itself is formed by one of the teeth of ring 18.

It will also be noted that the driving and motion limiting mechanism M is, at least in its correction course C, a mechanism of continuous braked motion (thanks to braking means 32, 42), the only discrete positions which it is adapted to occupy being the bounding positions P1 and P2.

It will be specified that operation of the driving mechanism M can be controlled only in a predetermined drawn out position of crown 26, the motion of the mechanism M being blocked in the other positions of crown 26. This operation is similar to that of the control of a standard date ring which is the reason for which it will not be described in any further detail here.

It is understood thus that the orientation disc 16 is kinematically coupled to a control element, that is to say, to the assembly stem 24 - crown 26 which is exterior to the watch and this advantageously by the driving and motion limiting mechanism M which on the one hand, is adapted to block the orientation disc in multiple stable positions within the correction course C and which, on the other hand, is adapted to limit the displacement of such orientation disc 16 between and to the two bounding positions P1 and P2.

Thus, since the orientation disc is uniquely directed by crown 26, it will be understood that it is adapted to pivot independently of the regular driving of the horometric movement which controls hands 1, 2 and 4.

In referring henceforth more particularly to FIGS. 1 and 2, it will be noted that the fixed dial 6 includes graduated reference guides 52 in a third region 50 which is coaxial to the first two regions 8 and 12 and which is directly adjacent orientation disc 16, these being arranged in a circular sector 54 of the third region 50.

Such graduated reference guides 52 are provided facing the mark N (North) of the orientation disc 16 substantially in coincidence with the correction course C in which it will be recalled the mark N may be displaced thanks to the driving mechanism M.

The graduation of such reference guides 52 corresponds preferably to fractions of an hour. Such hour fractions are marked respectively in this example in the clockwise sense, with every other one given the values $+\frac{1}{2}$ and $+1$ and in the counterclockwise sense likewise with every other one respectively given the values $-\frac{1}{2}$ and $-1$.

The gap between each whole value (1, 2, 3,...) corresponds to that which would be given if the reference guides 52 were uniformly graduated over 360° with 24 graduations, that is to say, with the graduation of a 24 hour dial.

In other words, the angular gap between each whole value is equal to 360/24, i.e. 15 degrees.

Thus, since the driving and motion limiting mechanism M is adapted to drive and block the mark N (North) relative to the graduated reference guides 52 in several predetermined stable positions which the user can choose, it is possible to correct any variation between the legal time of day displayed by the respective hours and minutes hands 1 and 2 and the true solar time of day.

It is sufficient for this as a function of the place where one is situated, to displace the mark N with the help of crown 26 and to bring this mark facing the reference guide corresponding to the variation between the two times, legal and true solar, namely facing the value $+\frac{1}{2}$ for a positive variation of 30 minutes, facing $+1$ for a positive variation of one hour and inversely for the negative variations in the other sense.

The reference guides 52 in combination with the movable adjustable disc 16 thus constitute correction means for the positioning of the cardinal points capable of taking into account the equation of time, that is to say, any variation between the legal time of day and true solar time.

It will be further noted that in order to bring about a correction with the help of the means which have just been described, the user will not undertake any correction of the time displayed, nor any modification of the relative position of the solar hand 4.

There is thus no possible confusion between the two times, legal and true solar, nor any loss of the time displayed.

Furthermore, the variation between these two times may be directly visualized and checked by looking at the position of the mark N on the reference guides 52 and in reading the indication of variation given by the latter.

It will also be specified that the driving mechanism M by limiting the possible angular displacement of the movable orientation disc 16 between the two bounding positions P1 and P2, constitutes a system of security against any false manipulation. Effectively, the indication North may not be displaced beyond its correction course C, so that it is impossible for it to occupy the place of a direction indication such as, in the extreme, that of South.

The arrangement of the cardinal points N, S, W and E on disc 16 is that which corresponds to the orientation in the Northern hemisphere, but as may be well understood, it would be inverted for utilization in the Southern hemisphere.

Furthermore, as is seen on FIGS. 1 and 2, dial 6 includes a fourth region 56 coaxial to the other three and adjacent to that on which are inscribed hours referenced 8 and in which are inscribed most of the known winds. These winds, the direction of origin of which is generally well known, enable the determination of the other cardinal points in case of absence of sun or hidden sun.

The operation of the compass watch according to the invention is the following.

Initially, one effects the correction operation from the equation of time with the help of crown 26 which is drawn into a predetermined position and then rotated in a chosen sense, in order to bring the indication N (North) facing the graduation or the value corresponding to the gap between legal time of day and true solar time.

The crown 26 is pushed into its initial position, the correction being completed.

In order to orient oneself, it is sufficient to point the solar hand 4 towards the sun, then to read on the orientation disc the direction indication given by the cardinal points N, S, W and E.

In referring henceforth to FIGS. 1 and 4 to 9, there will be described hereinafter a rotatable bezel according to the invention which is in particular intended to fit out a compass watch such as that which has just been described.

The bezel 100 according to the invention is intended to be mounted around dial 6, preferably of a compass watch MB, such as that shown on FIG. 1.

Such bezel 100 which has an annular form, is divided at its diameter D into two sectors 102 and 104, preferably substantially identical to one another. Sectors 102 and 104 have thus respectively a "C" form, each of such two "C"s showing two branches which are placed respectively end to end with the two branches of the other "C"

Figure 9:
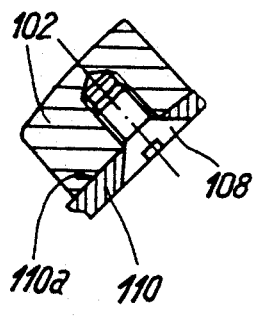
FIGS. 8 and 9 are cross-sections of the bezel of FIGS. 1 and 4 to 6 taken respectively along lines VIII—VIII of FIG. 7 and IX—IX of FIG. 6.
Figure 7:
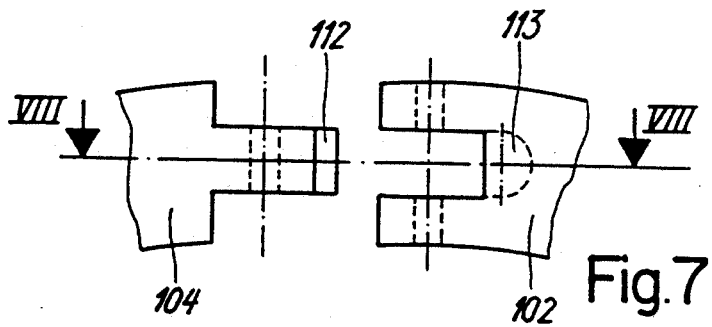
FIG. 7 is a view taken along arrow VII of FIG. 6 showing, in a more detailed manner, a joint of the bezel according to the invention.
Figure 8:
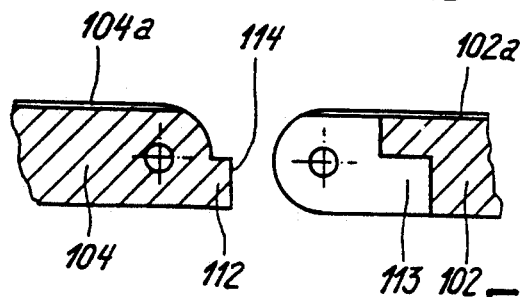

The two sectors 102, 104 are coupled between them by a joint or hinge 106 shown in a more detailed manner on FIGS. 7 to 9.

The first sector 102 is secured by means of three screws 108, one of which is visible on FIG. 9, to a rotatable ring 110 which is maintained and guided in rotation by the compass watch MB. Effecting the mounting of the rotatable ring 110 on watch MB is a standard operation which will thus not be described in a more detailed fashion.

From this fact, the first mounted sector 102 is movable and is guided in rotation relative to case B of the watch MB. Since both sectors 102 and 104 are coupled together, such assembly 102-104 which constitutes the essential portion of the bezel according to the invention may occupy multiple angular positions around case B of watch MB relative in particular to dial 6.

The second sector 104 rests freely in a first position referred to as the folded back or lying position with its lower side 104b on the rotating ring 110.

Figure 4:
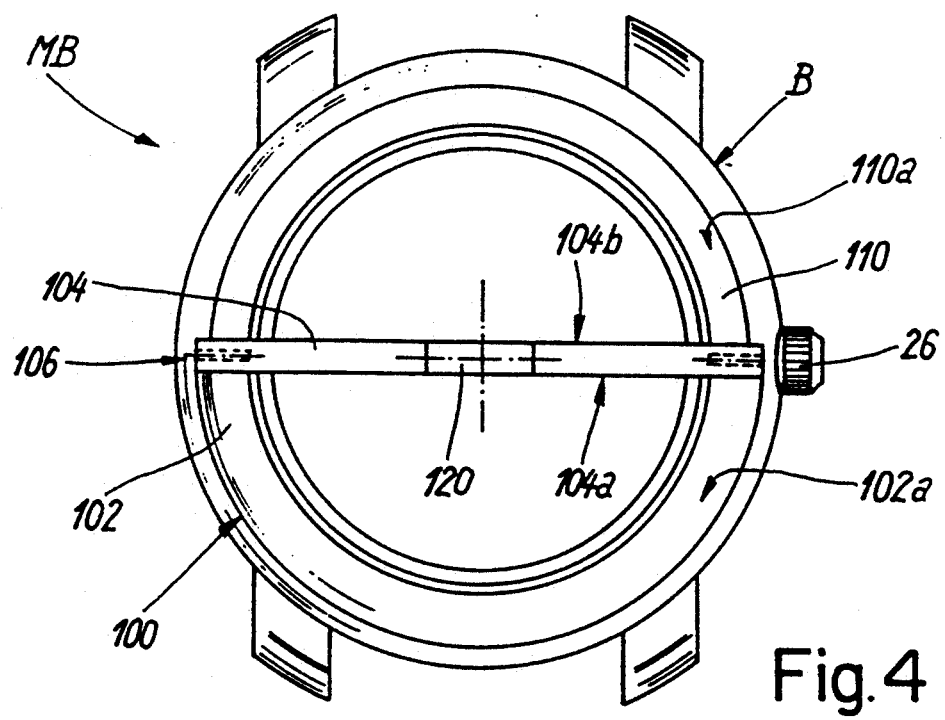
FIG. 4 is a schematic view from above of the compass watch according to the invention representing more particularly a rotating bezel intended in particular to fit out such a compass watch, such bezel being shown in its raised position in a first direction relative to the sun.
Figure 5:
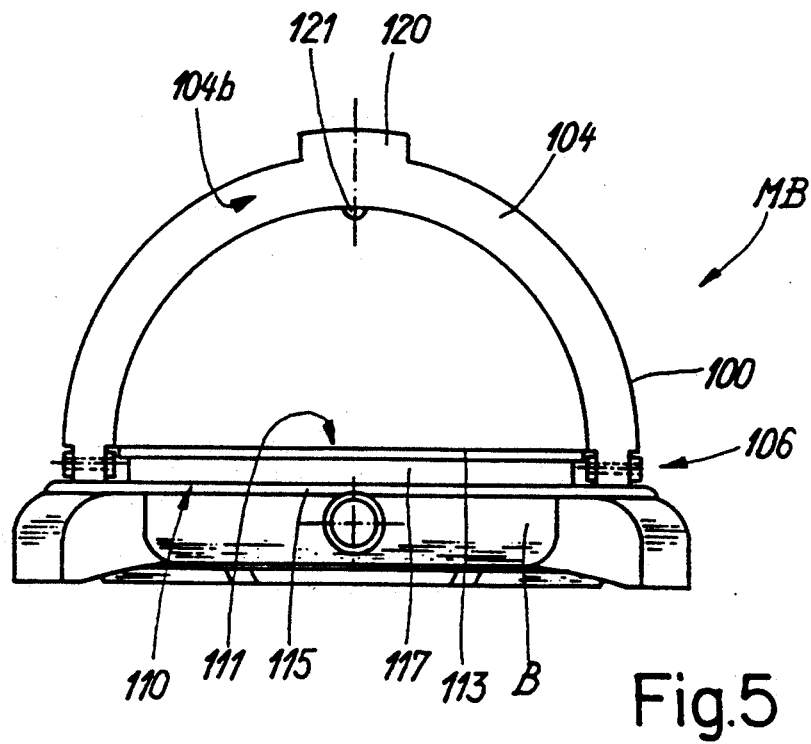
FIG. 5 is a side view of FIG. 4 showing the bezel oriented according to a second direction.
Figure 6:
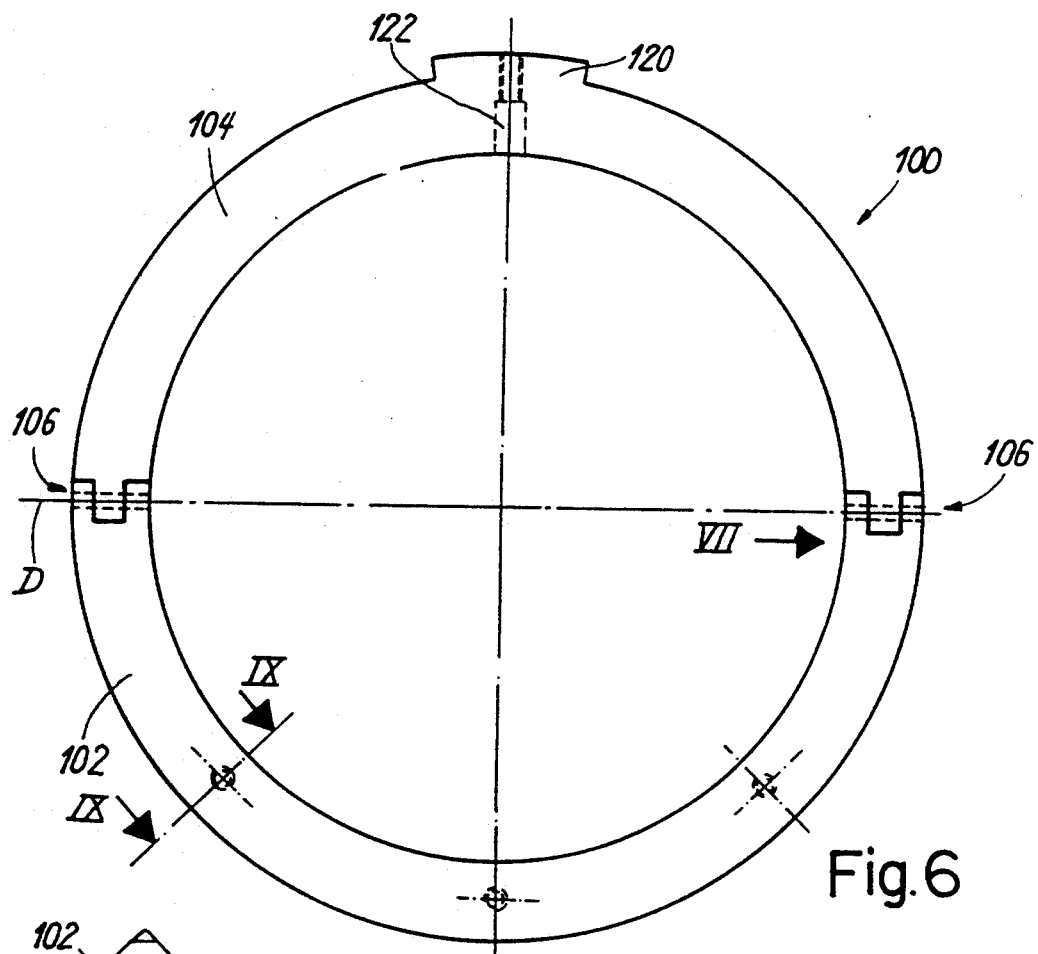
FIG. 6 is a top view of the bezel alone in its folded down position.

Thanks to the arrangement of the joint 106, the second sector 104 may occupy in addition to its first characteristic position shown on FIGS. 1 and 6, a second characteristic position referred to as the raised position shown on FIGS. 4 and 5 in which it may overlap dial 6 at least partially and, more particularly, the indicating element formed by the solar hand 4.

Bezel 100 according to the invention includes furthermore blocking means for sector 104 when it is in the raised position.

As is seen on FIG. 8, such blocking means are formed by heel 112, a single one of which is shown, provided at the end of at least one of the branches of the raisable sector 104 and preferably on both. At the end of the branch or branches corresponding to the "fixed" sector 102, there is provided a recess 113 opening out in the direction of heel 112 and in the direction of ring 110, not shown on this FIG.

Such heel 112, which is provided in the neighborhood of joint 106, constitutes a hard point when the sector 104 is brought from its folded down position to its raised position.

Sector 104 may thus be held fixed in a stable manner in a raised position at 90° from its folded back position.

It will be specified that another inclination may be chosen, for instance for aesthetic reasons, simply by giving to heel 112 a form other than that shown Effectively, the bearing surface 114 of such heel 112 which is intended to be brought to rest on ring 110 in the raised position of sector 104, has in the example as shown an inclination at 90° relative to its support plane formed by the upper face 110a of such ring 110. In other words, it is arranged perpendicularly to sector 104. It is for this reason that sector 104 is found in a corresponding stable position (at 90°) when it is in its raised position.

It will be specified here that one or both of the sectors 102 and 104 may be, in another embodiment, not shown, constituted by partial annular elements non-continuous, such as half "C"s with a single branch. To this end, bezel 100 would comprise only a single joint 106.

Bezel 100 further includes a gripping thumbnail catch 120 enabling the user to grasp sector 104 and to raise it when it is in its folded back position on watch MB.

From the central part of the rotating ring 110 is axially raised a cylindrical portion 111 at the free end of which is provided a flange 113. The separation between such flange 113 and the base 115 of ring 110 forms a circular groove 117.

In sector 104 and more particularly in the thumbnail catch 120 is provided a threaded diametral orifice 122 opening out at least towards the interior of the watch MB and in which may be housed a stopping arrangement, partially shown, formed by a ball 121 which is urged by a helical spring and which is intended to engage in the circular groove 117 provided in ring 110. When sector 104 is folded back, ball 121 retracts at the passage of flange 113 and under the opposing action of the spring is brought to be housed and to snap into the groove 117.

It will noted that on the upper faces 102a and 104a both sectors 102 and 104 include graduations associated with angular values in degrees from 0 to 360.

The operation of bezel 100 according to the invention is as follows.

When the user wishes to point the solar hand 4 of the compass watch MB towards the sun, he seizes initially the grasping thumbnail catch 120 and he raises sector 104. He next grasps sector 104 in its raised position as the ring of a key and causes the entire bezel to pivot on case B in order to arrange sector 104 substantially at a right angle to the solar hand 4, in overlapping at least partially above the latter.

Thus, sector 104 constitutes a retractable index particularly apt to be brought to project its shadow on the solar hand 4 in a manner best to orient such hand in the direction of the sun.

When the position of the different cardinal points has been determined by the compass watch MB, as explained hereinbefore, the user, after having traced on a map the line joining the point where he is located and that which he wishes to attain, places the watch MB on the map and places in coincidence mark N of the North of the watch with the North of the map, the central axis of the watch being positioned on the point of departure. At this instant the user knows in which direction is located the point which he wishes to attain.

The user again grasps sector 104 which is raised in order to turn the entire bezel 100 and to bring the indication of the value 0 (zero) either onto the trace which he has indicated on the map or onto the indication of North marked on the latter Next he returns sector 104 to its folded back position onto ring 110.

At this moment, the user may read the indications inscribed on bezel 100 and determine, in angular degrees, the direction which he must follow It will furthermore be indicated that the indications in degrees are obtained on bezel 100 in a manner such that at least the value 0 (zero) is marked on the fixed sector 102.

Thus, when the user grasps sector 104 which is raised, the indications marked on bezel 100 remain always visible and the 0 (zero) may be correctly positioned.

What I claim is:

1. A compass watch comprising:
   an horometric movement;
   time indicating elements cooperating with said horometric movement to provide time information, and
   orientation means to determine the orientation of cardinal points with respect to the position of a watch user, said orientation means comprising:
   a solar hand kinematically rotatably driven by said horometric movement at the rate of one complete revolution every twenty-four hours, said solar hand being intended to be pointed towards the sun,
   direction indicating means for indicating the direction of the cardinal points, said direction indicating means being independent of the rotation of the solar hand and arranged on the watch to determine the orientation of the watch user with respect to the cardinal points when the solar hand is pointed towards the sun,
   correcting means for correcting the position of the direction indicating means with respect to the solar hand, said correcting means comprising time difference indicating means which indicates a variation of time between a true solar time and a local time of day,
   driving means arranged to enable the direction indicating means to be rotated when a correction is desired, so as to bring the cardinal points into a corrected position with respect to the time difference indicating means, said corrected position corresponding to a known variation between said true solar time and said local time of day, and
   fixing means for maintaining the direction indicating means in its corrected position irrespective of the position of the solar hand.

2. A compass watch as set forth in claim 1 wherein said time difference indicating means comprise angularly spaced reference marks, said direction indicating means being positionable with respect to said reference marks.

3. A compass watch as set forth in claim 2 wherein said driving means and said fixing means are embodied in a motion limiting mechanism adapted to drive and to immobilize said direction indicating means into several corrected positions.

4. A compass watch as set forth in claim 3 wherein said reference marks for the correcting means are arranged on a dial of the watch.

5. A compass watch as set forth in claim 4 wherein said direction indicating means are materialized on an orientation disc adapted to pivot coaxially to the solar hand independently from the regular driving of the horometric movement.

6. A compass watch as set forth in claim 5 wherein said orientation disc is kinematically coupled to a control element accessible from the exterior of the watch.

7. A compass watch as set forth in claim 6 wherein said control element is a crown and said orientation disc is coupled to said crown through said motion limiting mechanism.

8. A compass watch as set forth in claim 7 wherein said motion limiting mechanism is adapted to immobilize the orientation disc in multiple stable positions corresponding to selected corrected positions and to limit its angular displacement between two bounding positions.

9. A compass watch as set forth in claim 8 wherein said motion limiting mechanism includes a ring bearing interior teeth of the date ring type which meshes with a driving pinion controlled by said crown and on which said orientation disc is secured.

10. A compass watch as set forth in claim 9 wherein said motion limiting mechanism is a mechanism having unbroken motion associated with means braking its motion between two bounding positions.

11. A compass watch as set forth in claim 10 wherein said ring includes at least two bared regions without teeth in a manner to uncouple said driving pinion and said ring in at least one rotation sense of said ring in the bounding positions of the orientation disc.

12. A compass watch as set forth in claim 11 wherein said braking means comprise a third bared region arranged on said ring and on which rubs an elastic element such as a spring blade of the jumper spring type.

13. A compass watch as set forth in claim 12 wherein said elastic element bears on end edges of said third bared region whilst forming abutment means therewith for said ring in its bounding positions.

14. A compass watch as set forth in claim 1, comprising a bezel which includes a retractable index displaceable between two positions, a first position in which it is folded back onto said bezel and a second raised position in which it is adapted to be arranged substantially at a right angle to said solar hand, at least partially overlapping above the latter in a manner to project the shadow from the sun onto said solar hand.

15. A compass watch as set forth in claim 14 wherein said bezel has an annular form divided into two sectors, a first of which is guided in rotation relative to the case of said watch and a second which constitutes said retractable index.

16. A compass watch as set forth in claim 15 wherein said two sectors of the bezel are coupled together by means of a joint or hinge substantially at the level of the diameter of said bezel.

17. A compass watch as set forth in claim 16 and further comprising blocking means for the retractable sector of the bezel when it is in its raised position.

18. A compass watch as set forth in claim 17 wherein said blocking means are formed by a heel arranged on the retractable sector of the bezel in the vicinity of said joint or hinge.

19. A compass watch as set forth in claim 18 wherein said bezel includes a gripping thumbnail catch enabling the raising of the retractable sector when it is in its folded-back position on said watch.

20. A compass watch as set forth in claim 19 wherein said bezel includes degree indications arranged on both the respective fixed and retractable sectors.

21. A compass watch as set forth in claim 20 wherein said degree indications are arranged on the bezel in a manner such that at least the zero value is marked on the fixed sector.

* * * * *